US012591918B2

(12) United States Patent
Archak et al.

(10) Patent No.: US 12,591,918 B2
(45) Date of Patent: Mar. 31, 2026

(54) AUTOMATICALLY GENERATING BASKETS OF ITEMS TO BE RECOMMENDED TO USERS OF AN ONLINE SYSTEM

(71) Applicant: Maplebear Inc., San Francisco, CA (US)

(72) Inventors: Shrikar Archak, Newark, CA (US); Shishir Kumar Prasad, Fremont, CA (US)

(73) Assignee: Maplebear Inc., San Francisco, CA (US)

( * ) Notice: Subject to any disclaimer, the term of this patent is extended or adjusted under 35 U.S.C. 154(b) by 192 days.

(21) Appl. No.: 18/202,768

(22) Filed: May 26, 2023

(65) Prior Publication Data

US 2024/0394771 A1 Nov. 28, 2024

(51) Int. Cl.
*G06Q 30/06* (2023.01)
*G06Q 30/0601* (2023.01)
*G06Q 30/08* (2012.01)

(52) U.S. Cl.
CPC ......... *G06Q 30/0631* (2013.01); *G06Q 30/08* (2013.01)

(58) Field of Classification Search
CPC . G06Q 30/0601; G06Q 30/0631; G06Q 30/08
(Continued)

(56) References Cited

U.S. PATENT DOCUMENTS

2015/0058154 A1* 2/2015 Appleyard ......... G06Q 30/0633
705/26.4

2018/0075503 A1* 3/2018 Ryner .................. G06F 16/275
2018/0130072 A1 5/2018 Ouimet et al.
2018/0268475 A1 9/2018 Ziskin
2020/0152080 A1* 5/2020 Wu .................... G06Q 30/0631
(Continued)

FOREIGN PATENT DOCUMENTS

CA 3219044 A1 * 12/2022 ......... G06Q 10/0833
DE 112018007030 T5 * 11/2020 ............. H04W 4/35
(Continued)

OTHER PUBLICATIONS

Mcgoldrick, Peter J..; Retail Pricing in the Context of Grocery Marketing PQDT—Global ProQuest Dissertations & Theses. (1984); Found in: ProQuest Dissertations and Theses Professional; retrieved from Dialog on Mar. 6, 2025 (Year: 1984).*
(Continued)

*Primary Examiner* — Yogesh C Garg
(74) *Attorney, Agent, or Firm* — Fenwick & West LLP

(57) ABSTRACT

Embodiments relate to automatically generating a basket of items to be recommended to a user of an online system. The online system communicates a basket opportunity to a group of retailers, wherein the basket opportunity defines a plurality of item categories each associated with a respective item to be included in a basket. The online system receives, from each retailer in response to the basket opportunity, a respective bid of a plurality of bids for the basket opportunity. The online system applies a computer model to each bid to determine a score for each bid and selects a winning bid for the user based on determined scores for the bids. For each item category, the online system populates the basket with a respective item from a catalog of a retailer that is associated with the winning bid. The online system then presents the basket with items to the user.

20 Claims, 6 Drawing Sheets

(58) Field of Classification Search
USPC ...................................................... 705/26.3
See application file for complete search history.

(56) References Cited

U.S. PATENT DOCUMENTS

| | | | |
|---|---|---|---|
| 2021/0004432 A1 | 1/2021 | Li et al. | |
| 2021/0256472 A1* | 8/2021 | Javidan | H04W 4/025 |
| 2021/0358003 A1 | 11/2021 | Godsey et al. | |
| 2023/0278753 A1* | 9/2023 | Austrheim | B65D 25/005 |
| | | | 220/661 |
| 2023/0351465 A1* | 11/2023 | Miziolek | G06Q 30/0206 |
| 2024/0289632 A1* | 8/2024 | Tan | G06N 3/092 |
| 2024/0354729 A1* | 10/2024 | Mattison | G06Q 20/1085 |

FOREIGN PATENT DOCUMENTS

| | | | | | |
|---|---|---|---|---|---|
| WO | WO-2017215741 A1 | * | 12/2017 | ............ | B25J 9/0093 |
| WO | WO-2022132040 A1 | * | 6/2022 | ............. | G06N 3/088 |

OTHER PUBLICATIONS

Nataraj et al. , "Recommendation and Rating System using Machine Learning," 2022 International Conference on Edge Computing and Applications (ICECAA), Tamilnadu, India, 2022, pp. 1175-1181, retrieved from IP. Com on 06252025 (Year: 2022).*

Ur Rahman et al., "Design and Development of Autonomous Warehouse Management Robot with Intelligent Software Framework," 2021 IEEE International Conference on Mobile Networks and Wireless Communications (ICMNWC), Tumkur, Karnataka, India, 2021, pp. 1-7, retrieved from IP. Com on Oct. 13, 2025. (Year: 2021).*

Article, "Method for Autonomous Delivery of Packages"; published in The IP. Com Journal at IP.Com PAD Sep. 14, 2018 , and retrieved from IP. Com on Dec. 22, 2025 (Year: 2018).*

PCT International Search Report and Written Opinion, PCT Application No. PCT/US 24/17630, Jun. 5, 2024, 13 pages.

* cited by examiner

Web Page
300

310

Selection of Baskets

Featured Baskets

| Basket 305A | Basket 305B | Basket 305C | Basket 305D | Basket 305E |
| Basket 305F | Basket 305G | Basket 305H | Basket 305I | Basket 305J |

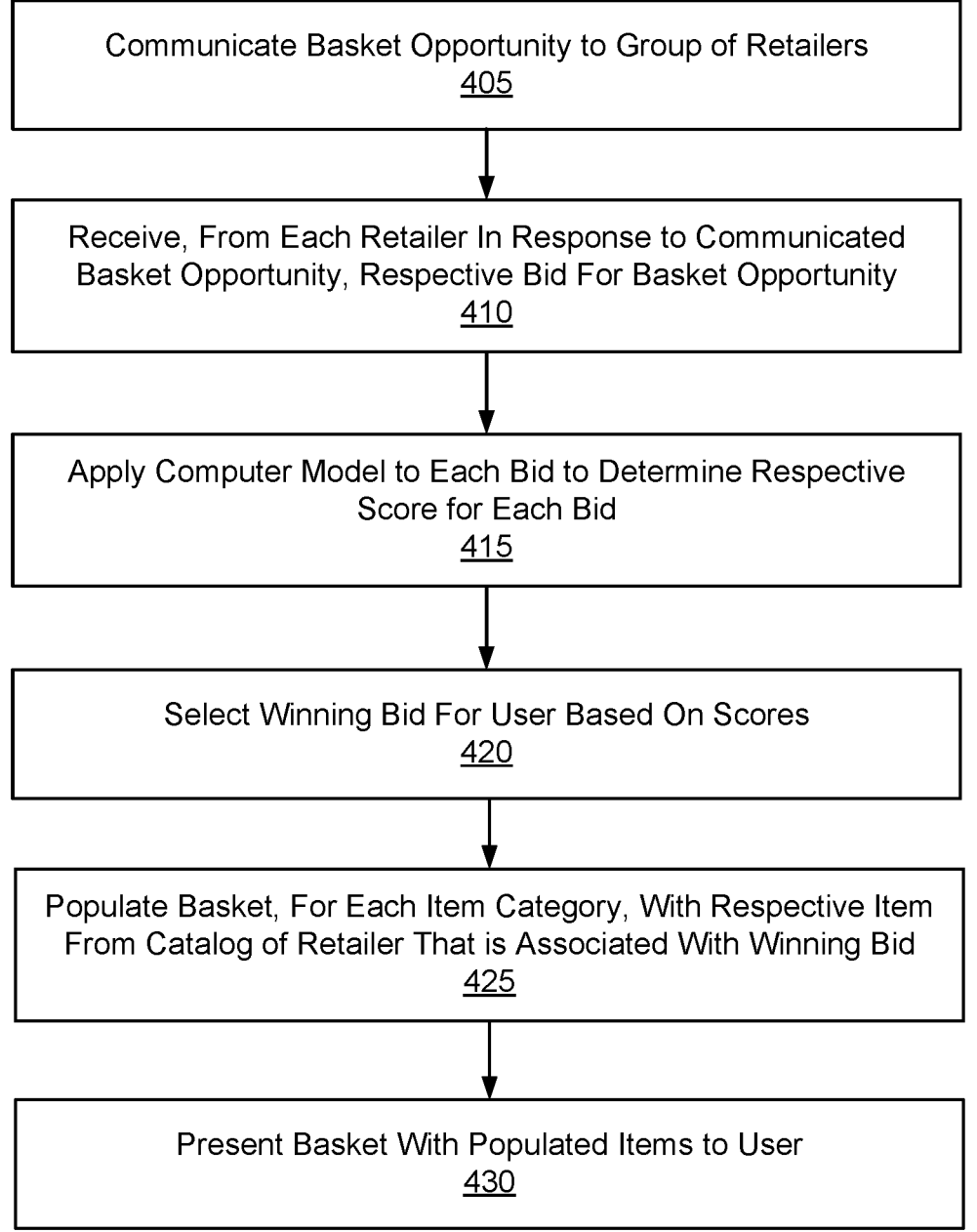

Communicate Basket Opportunity to Group of Retailers
405

Receive, From Each Retailer In Response to Communicated Basket Opportunity, Respective Bid For Basket Opportunity
410

Apply Computer Model to Each Bid to Determine Respective Score for Each Bid
415

Select Winning Bid For User Based On Scores
420

Populate Basket, For Each Item Category, With Respective Item From Catalog of Retailer That is Associated With Winning Bid
425

Present Basket With Populated Items to User
430

FIG. 4

AUTOMATICALLY GENERATING BASKETS OF ITEMS TO BE RECOMMENDED TO USERS OF AN ONLINE SYSTEM

BACKGROUND

Online systems, such as online concierge systems, may provide customers with recommendations of baskets of items formed around common themes. A basket generated by an online concierge system includes a predefined set of items (i.e., goods or products), which may be prepopulated by a human curator. One particular challenge for the online concierge system is how to generate baskets of items based on historical data available to the online concierge system. Another challenge for the online concierge system is how to target and/or identify a preferred set of entities (i.e., retailers) that have items suitable for the baskets so that they can bid to have their products included in the baskets that are recommended to users of the online concierge system.

SUMMARY

In accordance with one or more aspects of the disclosure, an online system communicates a basket opportunity to a group of retailers associated with an online system, wherein the basket opportunity defines a plurality of item categories each associated with a respective item to be included in a basket. The online system receives, from each retailer in the group in response to the communicated basket opportunity, a respective bid of a plurality of bids for the basket opportunity. For a particular user of the online system, the online system applies a computer model to each of the plurality of bids to determine a respective score of a plurality of scores for each of the plurality of bids, wherein the computer model is trained to predict a likelihood of the user selecting the basket if presented given information about the plurality of item categories. The online system selects a winning bid of the plurality of bids for a user of the online system based on the plurality of scores. The online system populates the basket, for each of the plurality of item categories, with a respective item of a plurality of items from a catalog of a retailer from the group of retailers that is associated with the winning bid. The online system then presents the basket to the user. The user can then easily include the plurality of items associated with the displayed basket into a shopping cart of the user without having to manually navigate the online system's site to find and add each item individually.

BRIEF DESCRIPTION OF THE DRAWINGS

FIG. 4 is a flowchart of a method of automatically generating a basket of items to be recommended to a user of an online concierge system, in accordance with one or more embodiments.

DETAILED DESCRIPTION

Figure 1A:
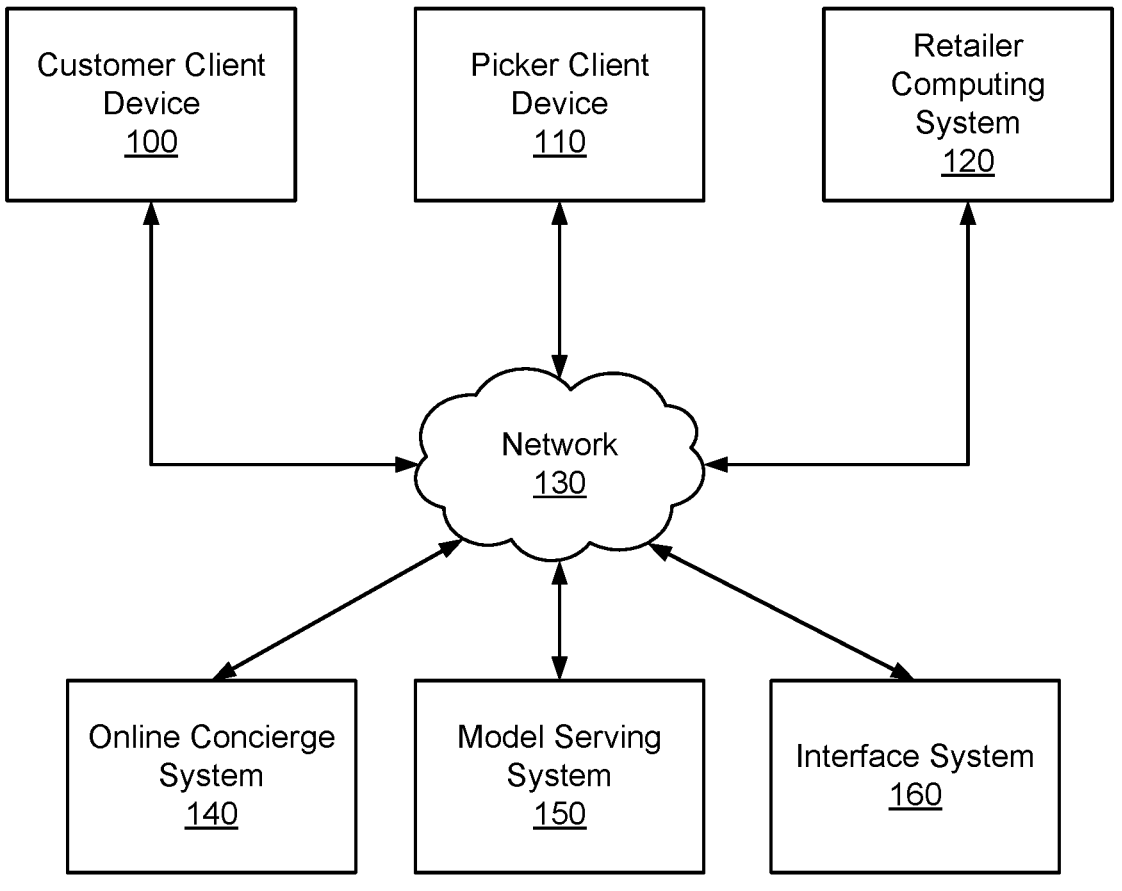
FIG. 1A illustrates an example system environment for an online concierge system, in accordance with one or more embodiments.

FIG. 1A illustrates an example system environment for an online concierge system 140, in accordance with one or more embodiments. The system environment illustrated in FIG. 1A includes a customer client device 100, a picker client device 110, a retailer computing system 120, a network 130, an online concierge system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customers client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

The model serving system 150 receives requests from the online concierge system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbots, and the like. In one or more embodiments, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online concierge system 140 or one or more entities different from the online concierge system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In accordance with embodiments of the present disclosure, the online concierge system 140 automatically generates one or more baskets for recommendation to a customer of the online concierge system 140. The customer can then easily add a generated basket with all its items into a shopping cart, without having to manually navigate a site of the online concierge system 140 to find and add each item individually. A basket includes a set of items associated with a set of categories that share a common theme. Some examples of baskets that can be formed around a common theme include: "High Protein Diet" basket, "High Fiber Diet" basket, "Valentine's Day" basket, "Mother's Day" basket, "Immunity Wagon" basket, "All Things Cold And Flu" basket, "All Things Baby" basket, "Male Bachelor" basket, etc. A basket of items can be generated by employing the LLM and machine-learning (e.g., based on customer's conversion data). In one or more embodiments, a basket opportunity that defines a set of item categories (i.e., set of product types) each associated with a respective item to be included in a basket can be generated by employing the LLM. Alternatively, the basket opportunity can be prepared by a human curator. The basket opportunity contains a set of item categories (i.e., set of product types) that share a common theme (e.g., "Valentine's Day", "High Protein Diet", etc.).

The online concierge system 140 prepares a first prompt for input to the model serving system 150, where the first prompt includes a list of items from various shopping carts, such as shopping carts associated with a particular customer or shopping carts associated with a plurality of customers of the online concierge system 140, as well as information about a common theme associated with a basket opportunity. The online concierge system 140 receives a first response to the first prompt from the model serving system 150 based on execution of the machine-learned model using the first prompt. The first response includes an ordered list of item categories around which a basket of items would be formed.

The online concierge system 140 prepares a second prompt for input to the model serving system 150, where the second prompt includes information about the ordered list of item categories and the common theme. The online concierge system 140 receives a second response to the second prompt from the model serving system 150 based on execution of the machine-learned model using the second prompt. The second response includes a textual description of an intent for the basket opportunity, i.e., a title or short description of the basket opportunity. The online concierge system 140 obtains the second response with the intent for the basket opportunity from the model serving system 150. The online concierge system 140 determines a group of targeted retailers associated with the online concierge system 140 by filtering a set of items from a plurality of retailers associated online concierge system 140 based on at least one of the second response (i.e., the textual description of the intent of the basket opportunity) and information about the ordered list of item categories around which the basket of items would be formed.

Based on biddings from the group of targeted retailers, the online concierge system 140 selects a winning bid and a set of items from a retailer associated with the winning bid to populate a basket, where the selected items satisfy a common theme around which the basket is formed. Each targeted retailer can be interfaced to the online concierge system 140 via its own retailer computing system 120 and the network 130. To enable the targeted group of retailers to bid on the basket opportunity, the online concierge system 140 interfaces the first response (i.e., the ordered list of item categories) and/or the second response (i.e., the intent for the basket opportunity) to an advertising module of the online concierge system 140 (not shown in FIG. 1A). The advertising module of the online concierge system 140 then communicates the first response and/or the second response to the targeted group of retailers via the network 130. Upon reception of the first response and/or the second response from the online concierge system 140, each targeted retailer provides, via the network 130 to the advertising module of the online concierge system 140, a respective bid for the basket opportunity. Hence, the targeted group of retailers bid on a description of the basket opportunity and/or categories of items (i.e., product types) of items to be included in a basket. Based on bids from the targeted group of retailers and a machine-learning algorithm that optimizes for a conversion of a particular customer, the online concierge system 140 determines a winning retailer and the winning retailer's items for populating the basket.

The online concierge system 140 further prepares a third prompt for input to the model serving system 150, where the third prompt includes a description of items populated into the basket (i.e., information about characteristics and/or components of the basket) and/or a profile of the customer. The online concierge system 140 receives a third response to the third prompt from the model serving system 150 based on execution of the machine-learned model using the third prompt. The third response includes a description of the basket for presentation to the customer via the customer client device 100.

In one or more embodiments, the task for the model serving system 150 is based on knowledge of the online concierge system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one or more embodiments, the online concierge system 140 is connected to an interface system 160. The interface system 160 receives external data from the online concierge system 140 and builds a structured index over the external data using, for example, another machine-learned language model or heuristics. The interface system 160 receives one or more queries from the online concierge system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online concierge system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

Figure 1B:
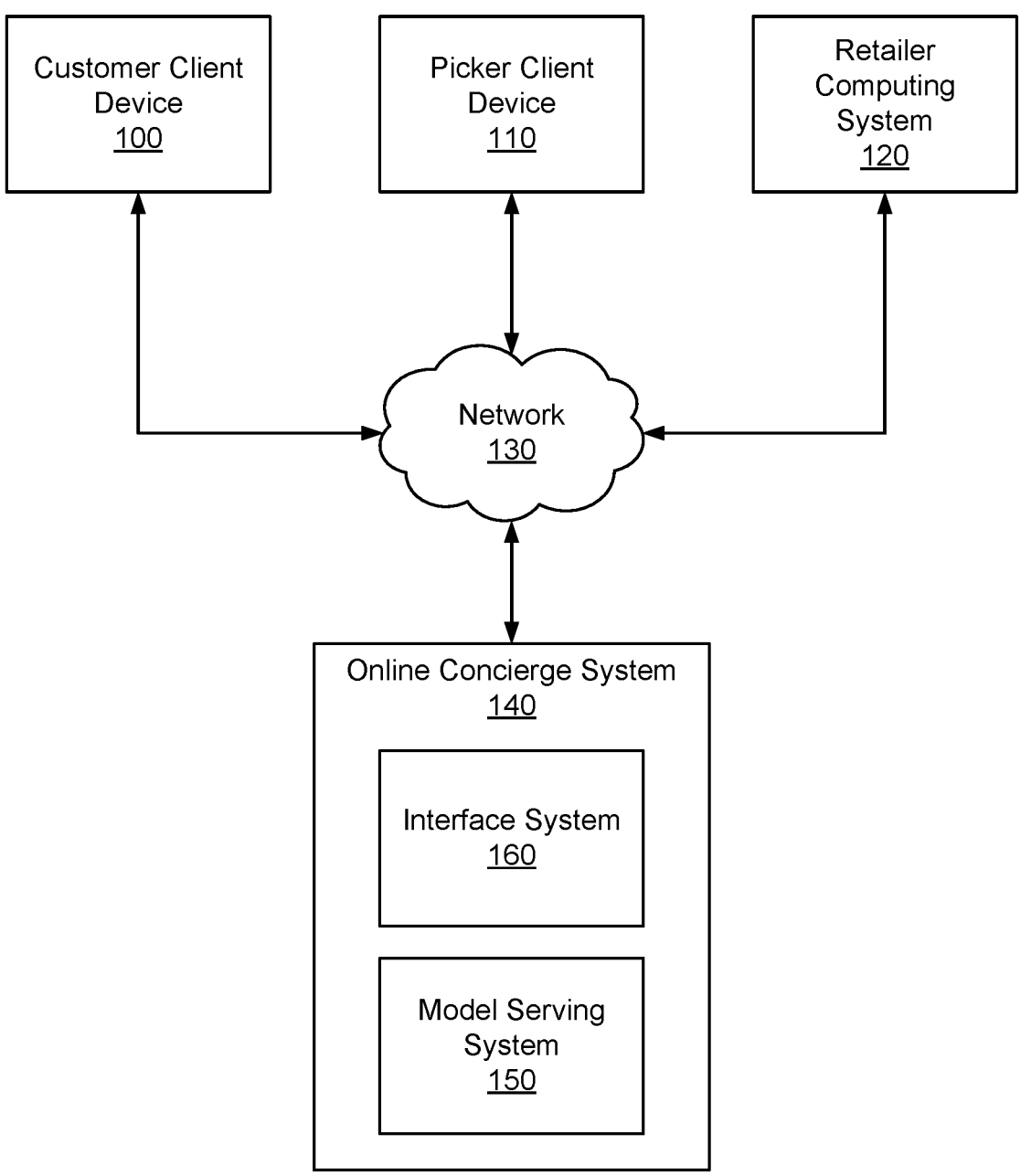
FIG. 1B illustrates an example system environment for an online concierge system, in accordance with one or more embodiments.

FIG. 1B illustrates an example system environment for an online concierge system 140, in accordance with one or more embodiments. The system environment illustrated in FIG. 1B includes a customer client device 100, a picker client device 110, a retailer computing system 120, a network 130, and an online concierge system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online concierge system 140. In one or more embodiments, as illustrated in the example system environment in FIG. 1B, the model serving system 150 and/or the interface system 160 is managed and deployed by the entity managing the online concierge system 140.

Figure 2:
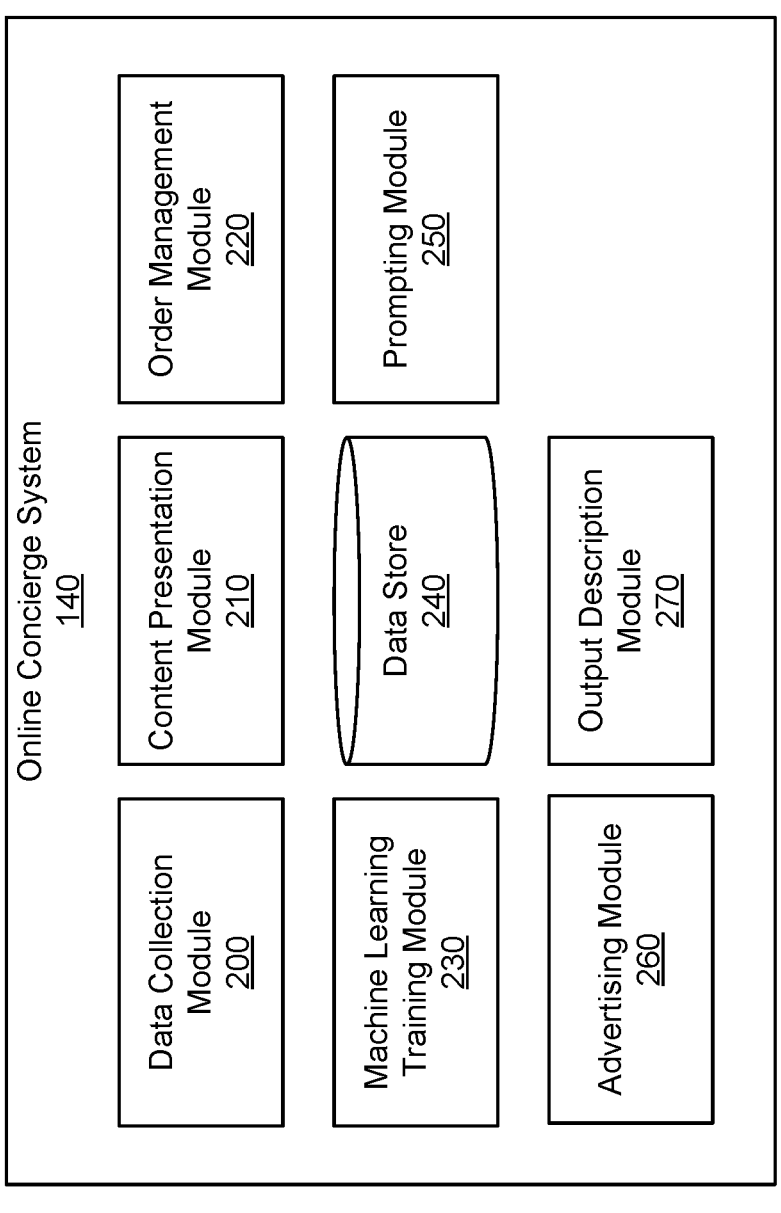
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, a prompting module 250, an advertising module 260, and an output description module 270. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. For example, the machine learning training module 230 may train the item selection model, the availability model, or any of the machine-learned models deployed by the model serving system 150. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online concierge system 140. In another embodiment, when the model serving system 150 is included in the online concierge system 140, the machine-learning training module 230 may further train parameters of the machine-learned model based on data specific to the online concierge system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

The prompting module 250 constructs a prompt and a task request for the LLM of the model serving system 150. The prompting module 250 may construct a prompt at a customer level that includes one or more actual shopping baskets associated with a specific customer (i.e., lists of items that the customer ordered over a defined time period or is currently ordering). The prompting module 250 constructs a task request for the LLM to identify one or more common themes in items purchased by the specific customer. An example prompt and the task request for the LLM of the model serving system 150 at the customer level may be: "This is a customer that has bought the following items in the last 30 days. Define the shopping behaviors or product themes in the user's purchasing history?"

Alternatively, the prompting module 250 may construct a prompt at an aggregate level that includes historical lists of items (e.g., obtained from the data store 240) that were purchased over a defined time period by a plurality of customers of the online concierge system 140. The historical list of items may identify, e.g., the most common items that customers purchase, which can be obtained from orders data available at the data store 240. In addition to the orders data and predefined themes, the prompting module 250 may also construct a prompt that includes a list of themes received from one or more retailers associated with the online concierge system 140. Alternatively or additionally, the prompting module 250 may construct a prompt that includes a list of items from a catalog of the online concierge system 140 (e.g., available at the data store 240). The prompting module 250 constructs a task request for the LLM to identify themes in items purchased by a defined set of customers. Additionally, the prompting module 250 may construct a task request for the LLM with a 'job to be done' taxonomy to identify what are customers of the online concierge system 140 trying to accomplish, e.g., stock up, weekly shop, quick order for a missing item, etc.

The prompt and the task request constructed by the prompting module 250 (either at a customer level or aggregate level) is fed into the LLM of the model serving system 150. The LLM generates a response to the prompt and the task request where the response includes an ordered list of themes across a whole population of shopping carts. Each theme from the ordered list may be utilized to form a respective basket opportunity that defines a plurality of item categories that share that common theme, wherein each item category is associated with a respective item to be included in a future basket. The model serving system 150 feeds the response with the ordered list of themes (i.e., basket opportunities) to the advertising module 260 to enable personalized ad targeting and bidding on each theme, i.e., on each basket opportunity.

The advertising module 260 may inform retailers about a basket opportunity (i.e., theme or intent of a future basket) that the retailers can target. Alternatively, the advertising module 260 may inform the retailers that the online concierge system 140 would perform automatic targeting for the retailers based on a theme identified in one or more customers' shopping carts. The advertising module 260 may determine that a theme being generated is too broad or too narrow, e.g., based on measured performance of ads. To adjust for this, the prompting module 250 can update the prompt and the task request accordingly. Additionally or alternatively, a theme may change over time, such as one or more new retailers become associated with the online concierge system 140. In such cases, the LLM of the model serving system 150 may uncover one or more new themes or revise an old theme, and provide to the advertising module 260 an updated response with a list of new and/or revised themes.

Given the theme (i.e., basket opportunity) from the LLM, the advertising module 260 may target or identify a group of retailers to allow these targeted retailers to bid on the basket opportunity and potentially add their items to a future basket. The advertising module 260 may identify the group of retailers using, e.g., machine-learning based targeting. The advertising module 260 may filter a set of items from a plurality of retailers based on the theme (or, equivalently, intent) of the basket opportunity in order to determine the group of targeted retailers. In this manner, the advertising module 260 finds the group of retailers (i.e., filtered or appropriate retailers) that have appropriate items to populate the future basket.

The advertising module 260 may communicate information about the basket opportunity (i.e., intent and/or set of item categories defined by the basket opportunity) to the group of targeted retailers. The prompting module 250 may construct a prompt for the LLM of the model serving system 150 to provide a short description for the basket opportunity based on the theme of the basket opportunity. The information about the basket opportunity communicated to the group of targeted retailers may thus include a short description of the basket opportunity. Alternatively, a human curator can provide a short description for the basket opportunity, which would be then communicated to the group of targeted retailers.

The advertising module 260 generates one or more requests for the group of targeted retailers to bid on the basket opportunity based on the communicated information about the basket opportunity. The advertising module 260 receives a plurality of bids from the group of targeted retailers, where the bids can be provided depending on an objective of an auction of the advertising module 260, e.g., cost per thousand impressions (CPM), cost per click (CPC), cost per action (CPA), etc. Given the information about the basket opportunity, the group of targeted retailers bid to add their items in the future basket for a price decided by the auction.

For a particular customer of the online concierge system 140, the advertising module 260 may apply a computer model to the plurality of bids received from the group of targeted retailers and determines a winning bid for the customer. The computer model deployed by the advertising module 260 may run a machine-learning algorithm to provide a score to each bid. The advertising module 260 determines the winning bid for the customer based on scores of all bids received from the group of targeted retailers by, e.g., selecting a bid with the highest score. The machine learning module 230 may train the computer model deployed by the advertising module 260 to predict a likelihood of the customer selecting a basket of items if presented to the customer, given that the basket includes items (i.e., products) of a known set of item categories (i.e., product types) as defined in the basket opportunity without actual items being selected.

The advertising module 260 may further decide which items of the winning retailer would populate each item category (i.e., product type) slot of a basket, such as when the winning retailer has multiple items that fit within a definition of an item category of the basket. The advertising module 260 may deploy the computer model to provide a score to each candidate item for each item category offered by the winning retailer, e.g., based on a predicted likelihood of a conversion by the customer if that candidate item is added to the basket. In this manner, the advertising module 260 may select a plurality of items for populating the basket, wherein each of the plurality of items is associated with a respective item category of the basket. Alternatively, the advertising module 260 may deploy the computer model to apply a multi-arm bandit algorithm to candidate items from the winning retailer to select a specific set of items for populating the basket, wherein each item in the set is associated with a respective item category of the basket. Hence, the advertising module 260 optimizes content of the basket for a conversion of the basket by a given customer.

The content presentation module 210 presents to the customer the basket with the selected set of items from the retailer that is associated with the winning bid. Presenting the basket to the customer causes the customer client device 100 to display the basket with an option to add the set of items associated with the displayed basket into a shopping cart of the customer. The customer can then easily include the items associated with the displayed basket into a shopping cart without having to manually navigate a site of the online concierge system 140 to find and add each item individually.

The output description module 270 outputs to the customer a short description (or title) of a basket that is being presented to the customer. In one embodiment, the output description module 270 generates the short description of the basket, based on a profile of the customer, a theme associated with the basket, and/or information about items included in the basket. The output description module 270 may further analyze purchases over a defined time period associated with a set of customers and map each customer from the set into a corresponding cohort. The output description module 270 may generate a short description (or title) of a basket for presentation to the customer based at least in part on a cohort into which a given customer is mapped to.

In another embodiment, the prompting module 250 constructs a prompt and a task request to the LLM of the model serving system 150 to generate a short description (or title) of a basket for a given customer. The prompting module 250 may construct a prompt that includes a profile of the customer, a theme of the basket, and/or information about items in the basket. An example prompt and the task request for the LLM of the model serving system 150 may be: "Describe this particular basket and what kind of shopping behaviors or themes are included in this basket. Keep it narrow and concise." In future iterations, the prompt and the task request for the LLM of the model serving system 150 may be refined (e.g., by the prompting module 250) into, e.g., "only categorize the basket into these item categories: x, y, z," where x, y, z are known item categories that have been discovered in earlier iterations of the LLM algorithm. The output description module 270 receives a response to the prompt from the model serving system 150 based on execution of the LLM using the prompt. The response received at the output description module 270 includes a short description (or title) of a basket that can be output for presentation to a given customer.

Figure 3A:
FIG. 3A illustrates an example portion of a webpage of an online concierge system with featured baskets of items presented to a customer of the online concierge system, in accordance with one or more embodiments.

FIG. 3A illustrates an example portion of a web page 300 of the online concierge system 140 with baskets of items presented to a customer of the online concierge system 140, in accordance with one or more embodiments. The web page 300 is presented to the customer via the customer client device 100. The web page 300 can be an application web page of the online concierge system 140. Alternatively, the web page 300 can be a web page of the online concierge system 140 on an Internet browser. The web page 300 can include fewer or more baskets than what is shown in FIG. 3A. The online concierge system 140 presents (e.g., via the content presentation module 210) the web page 300 with selection of featured baskets 305A-305J to the customer. Each basket 305A-305J may include a title (or short description) associated with that particular basket, which may be generated by the LLM of the model serving system 150. Optionally, each basket 305A-305J may further include a corresponding image (i.e., icon) that is associated with that particular basket (e.g., generated via the content presentation module 210 based on an output of the LLM). The customer can include one or more of the featured baskets 305A-305J into a shopping cart 310.

Figure 3B:
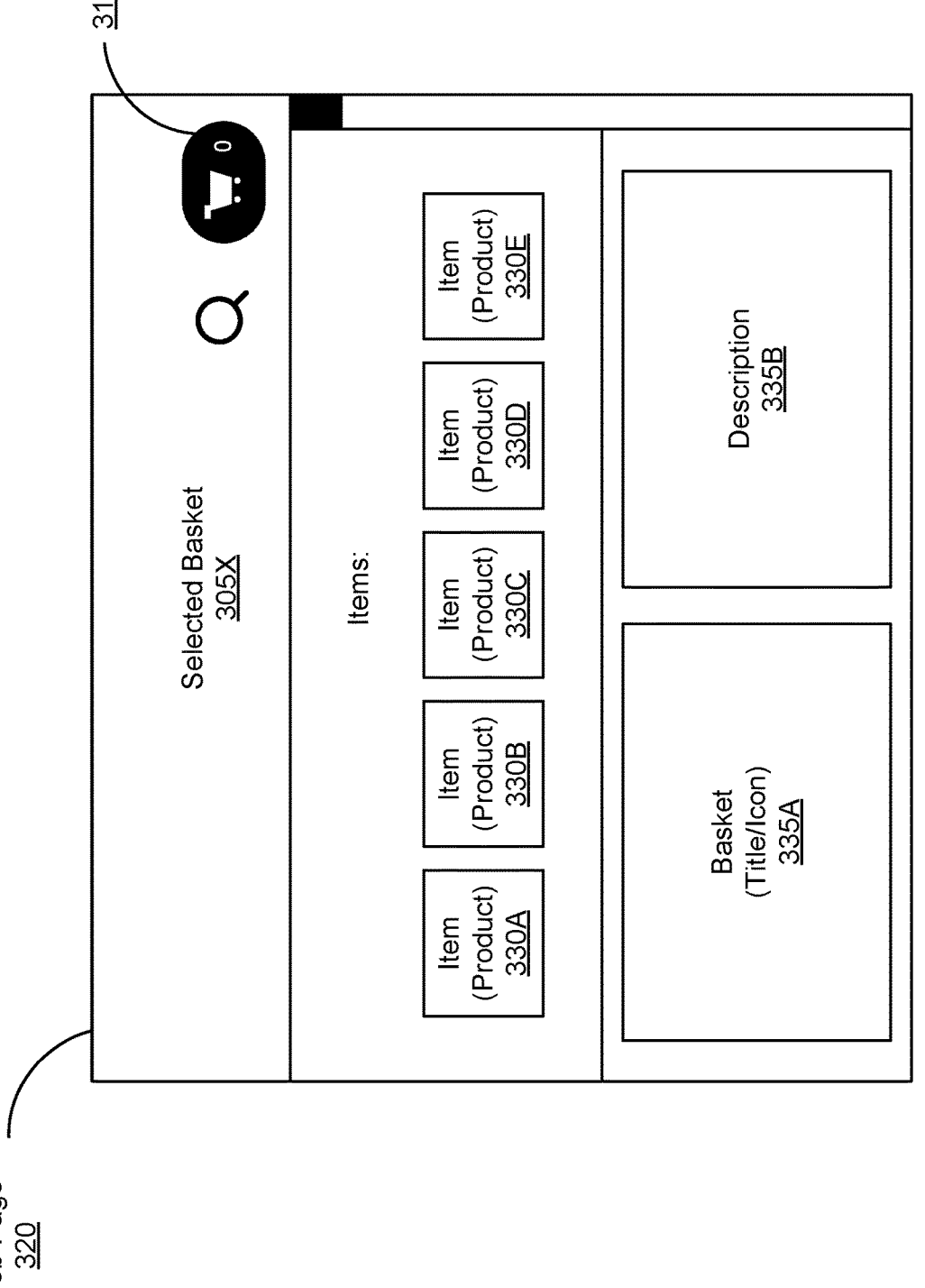
FIG. 3B illustrates an example portion of a webpage of an online concierge system with a basket of items presented to a customer of the online concierge system, in accordance with one or more embodiments.

FIG. 3B illustrates an example portion of a web page 320 of the online concierge system 140 with a basket of items presented to a customer of the online concierge system 140, in accordance with one or more embodiments. The web page 320 is presented to the customer via the customer client device 100. When the customer selects for viewing any of the baskets 305A-305J, the web page 300 changes into the web page 320 with an expanded view of the selected basket 305A-305J. The online concierge system 140 generates the web page 320 that presents (e.g., via the content presentation module 210 and the output description module 270) a basket 305X (e.g., any of the baskets 305A-305J that is selected for viewing) and items (products) 330A-330E that were populated in the basket 305X. The basket 305X presented via the web page 320 may include fewer or more items than what is shown in FIG. 3B. Each item (product) 330A-330E may include a name and a picture associated with that item 330A-330E. The web page 320 may further include additional details of the basket 305X, such as a title/icon 305A of the basket 305X (e.g., provided via the content presentation module 210) and a description 335B of the basket 305X (e.g., provided via the output description module 270). The customer can easily include the item 330A-330E associated with the displayed basket 305X into the shopping cart 310 without having to manually navigate a site of the online concierge system 140 to find and add each item individually.

FIG. 4 is a flowchart of a method of automatically generating a basket of items to be recommended to a user of an online concierge system, in accordance with one or more embodiments. Alternative embodiments may include more, fewer, or different steps from those illustrated in FIG. 4, and the steps may be performed in a different order from that illustrated in FIG. 4. These steps may be performed by an online concierge system (e.g., the online concierge system 140). Additionally, each of these steps may be performed automatically by the online concierge system without human intervention.

The online concierge system 140 communicates 405 (e.g., via the advertising module 260) a basket opportunity to a group of retailers associated with the online concierge system 140, wherein the basket opportunity defines a plurality of item categories each associated with a respective item to be included in a basket. A set of items purchased by one or more users of the online concierge system 140 may be fed into a LLM (e.g., of the model serving system 150) to generate the plurality of item categories. The online concierge system 140 may request (e.g., via the prompting module 250) a LLM (e.g., of the model serving system 150) to provide a textual description of an intent of the basket opportunity based on a prompt input into the LLM, wherein the prompt includes information about the plurality of item categories. The online concierge system 140 may communicate (e.g., via the advertising module 260) the textual description of the intent of the basket opportunity to the group of retailers. The online concierge system 140 may determine (e.g., via the advertising module 260) the group of retailers by filtering a set of items from a plurality of retailers associated with the online concierge system 140 using at least one of information about the plurality of item categories and the textual description of the intent of the basket opportunity.

The online concierge system 140 receives 410 (e.g., at the advertising module 260), from each retailer in the group in response to the communicated basket opportunity, a respective bid of a plurality of bids for the basket opportunity. Each retailer in the group of retailers may provide the respective bid to the online concierge system 140 depending on an objective of an advertising campaign of the online concierge system 140.

The online concierge system 140 applies 415, for a user of the online concierge system 140, a computer model (e.g., via the advertising module 260) to each of the plurality of bids to determine a respective score of a plurality of scores for each of the plurality of bids. The computer model is trained to predict a likelihood of the user selecting the basket if presented given information about the plurality of item categories that define the basket opportunity. The computer model may determine the respective score for each of the plurality of bids based on a predicted likelihood of the user selecting the basket populated with a set of items from a respective retailer of the group of retailers that is associated with that bid. The online concierge system 140 selects (e.g., via the advertising module 260) a winning bid of the plurality of bids for the user based on the plurality of scores.

The online concierge system 140 populates 425 (e.g., via the advertising module 260) the basket, for each of the plurality of item categories, with a respective item of a plurality of items from a catalog of a retailer from the group of retailers that is associated with the winning bid. For the particular user, the online concierge system 140 may determine (e.g., via the computer model deployed by the advertising module 260) the respective item from the catalog for each of the plurality of item categories. The computer model may determine, for the particular user, the respective item from the catalog for each of the plurality of item categories, based on one or more attributes of that item category and information about a set of items of that item category purchased by the user over a defined time period. The computer model may provide a score to each candidate item of a plurality of candidate items from the catalog of the retailer for each of the plurality of item categories, based on a predicted likelihood of the user selecting the basket populated with that candidate item. The computer model may determine the respective item for populating the basket based on the score of each candidate item. The computer model may apply a multi-arm bandit algorithm to a plurality of candidate items from the catalog of the retailer for each of the plurality of item categories to select the respective item for populating the basket.

The online concierge system 140 presents 430 (e.g., via the content presentation module 210) the basket to the user. Presenting the basket to the user causes a device of the user (e.g., the customer client device 100) to display the basket with an option to add the plurality of items associated with the displayed basket into a shopping cart of the user. The online concierge system 140 may determine (e.g., via the computer model deployed by the advertising module 260) a profile of the user based at least in part on information about a set of items purchased by the user over a defined time period. The online concierge system 140 may prompt (e.g., via the prompting module 250) a LLM (e.g., of the model serving system 150) based on the profile of the user and information about the plurality items populated in the basket to generate a description of the basket for presentation to the user via the device of the user.

Embodiments of the present disclosure are directed to automatically generating a basket of items to be recommended to a customer of the online system, based on customer's conversion data while employing a computer model (e.g., machine-learning algorithm) and LLM. Specific groups of retailers are targeted by the online system to bid for a broad selection of baskets of items formed around common themes. The online system presented herein allow a group of targeted retailers to bid on a predefined basket opportunity that defines a set of item categories (i.e., set of product types), while efficiently communicating an intent (i.e., short description) of the basket opportunity (e.g., obtained by employing the LLM) to the group of targeted retailers. The online system presented herein further allows for efficient scoring of bids received from the group of targeted retailers given a selection of items from the targeted retailers. The online system presented herein further provides for selection of a set of retailer's items to be included in a basket based on a predicted likelihood that the customer would select the basket if presented and populated with the set of retailer's items.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:

communicating, via a network and to a group of devices associated with a group of entities, a signal indicative of a conversion opportunity, wherein the conversion opportunity defines a plurality of item categories each associated with a respective item to be included in a set of items associated with the plurality of item categories that share a common theme;

responsive to the communicated signal, receiving, via the network and from each device associated with a respective entity in the group of entities, a respective offer of a plurality of offers for the conversion opportunity;

applying a machine-learning model to each of the plurality of offers and information about one or more items of each of the plurality of item categories that are converted by a user of an online system over a defined time period to generate a respective score of a plurality of scores for each of the plurality of offers, wherein the machine-learning model is trained to predict a likelihood of the user selecting the set of items provided by the respective entity if presented given information about the plurality of item categories, the respective score indicative of the predicted likelihood;

selecting, using the plurality of scores, an offer of the plurality of offers;

populating the set of items, for each of the plurality of item categories, with a respective item of a plurality of items from a database of an entity from the group of entities that is associated with the selected offer;

presenting the set of items to the user, wherein presenting the set of items to the user causes a device associated with the user to display a user interface with information about the set of items, an icon representing the set of items, and an option to add the set of items displayed at the user interface into a cart of the user;

receiving, via the network and from the device associated with the user, information about adding the set of items into the cart and placing an order including the set of items;

responsive to placing the order, assigning a servicing of the order to a picker that is a fully-autonomous robot;

upon assigning the servicing of the order, instructing, via collection instructions stored at the computer-readable medium and executed by the processor, the picker operating as the fully-autonomous robot to collect the set of items in a retailer location;

physically collecting, by the picker operating as the fully-autonomous robot and using the collection instructions, the set of items in the retailer location;

upon collecting the set of items in the retailer location, controlling, via navigation instructions stored at the computer-readable medium and executed by the processor, a movement of the fully-autonomous robot along with an autonomous vehicle from the retailer location to a delivery location associated with the user; and moving, along a navigation route identified using the navigation instructions, the fully-autonomous robot along with the autonomous vehicle from the retailer location to the delivery location for delivering the set of items to the user at the delivery location.

2. The method of claim 1, further comprising:

feeding a collection of items purchased by one or more users of the online system into a large language model (LLM) to generate the plurality of item categories for the conversion opportunity.

3. The method of claim 1, further comprising:

requesting a large language model (LLM) to provide a textual description of an intent of the conversion opportunity based on a prompt input into the LLM, wherein the prompt includes information about the plurality of item categories; and communicating the textual description of the intent of the conversion opportunity to the group of entities.

4. The method of claim 3, further comprising:

determining the group of entities by filtering a collection of items from a plurality of entities associated with the online system using at least one of information about the plurality of item categories and the textual description of the intent of the conversion opportunity.

5. The method of claim 1, further comprising:

generating, by the machine-learning model, the respective score for each of the plurality of offers based on the predicted likelihood of the user selecting the set of items provided by the respective entity of the group of entities that is associated with each of the plurality of offers.

6. The method of claim 1, further comprising:

identifying, by the machine-learning model and for the user, the respective item from the database for each of the plurality of item categories.

7. The method of claim 1, further comprising:

identifying, by the machine-learning model and for the user, the respective item from the database for each of the plurality of item categories, based on one or more attributes of that item category and information about a set of items of that item category purchased by the user over a defined time period.

8. The method of claim 1, further comprising:

providing, by the machine-learning model, a score to each candidate item of a plurality of candidate items from the database of the entity for each of the plurality of item categories, based on a predicted likelihood of the user selecting a set of items populated with that candidate item; and identifying, by the machine-learning model, the respective item for populating the set of items based on the score of each candidate item.

9. The method of claim 1, further comprising:

applying, by the machine-learning model, a multi-arm bandit algorithm to a plurality of candidate items from the database of the entity for each of the plurality of item categories to select the respective item for populating the set of items.

10. The method of claim 1, further comprising:

identifying, by the machine-learning model, a profile of the user based at least in part on information about a collection of items purchased by the user over a defined time period; and prompting a large language model (LLM) with the profile of the user and information about the populated set of items to generate a description of the set of items for presentation to the user at the user interface.

11. The method of claim 1, wherein each entity in the group of entities provides the respective offer depending on an objective of an advertising campaign of the online system.

12. A computer program product comprising a non-transitory computer-readable storage medium having instructions encoded thereon that, when executed by a processor, cause the processor to perform steps comprising:

communicating, via a network and to a group of devices associated with a group of entities, a signal indicative of a conversion opportunity, wherein the conversion opportunity defines a plurality of item categories each associated with a respective item to be included in a set of items associated with the plurality of item categories that share a common theme;

responsive to the communicated signal, receiving, via the network and from each device associated with a respective entity in the group of entities, a respective offer of a plurality of offers for the conversion opportunity;

applying a machine-learning model to each of the plurality of offers and information about one or more items of each of the plurality of item categories that are converted by a user of an online system over a defined time period to generate a respective score of a plurality of scores for each of the plurality of offers, wherein the machine-learning model is trained to predict a likelihood of the user selecting the set of items provided by the respective entity if presented given information about the plurality of item categories, the respective score indicative of the predicted likelihood;

selecting, using the plurality of scores, an offer of the plurality of offers;

populating the set of items, for each of the plurality of item categories, with a respective item of a plurality of items from a database of an entity from the group of entities that is associated with the selected offer;

presenting the set of items to the user, wherein presenting the set of items to the user causes a device associated with the user to display a user interface with information about the set of items, an icon representing the set of items, and an option to add the set of items displayed at the user interface into a cart of the user;

receiving, via the network and from the device associated with the user, information about adding the set of items into the cart and placing an order including the set of items;

responsive to placing the order, assigning a servicing of the order to a picker that is a fully-autonomous robot;

upon assigning the servicing of the order, instructing, via collection instructions stored at the computer-readable storage medium and executed by the processor, the picker operating as the fully-autonomous robot to collect the set of items in a retailer location;

physically collecting, by the picker operating as the fully-autonomous robot and using the collection instructions, the set of items in the retailer location;

upon collecting the set of items in the retailer location, controlling, via navigation instructions stored at the computer-readable storage medium and executed by the processor, a movement of the fully-autonomous robot along with an autonomous vehicle from the retailer location to a delivery location associated with the user; and moving, along a navigation route identified using the navigation instructions, the fully-autonomous robot along with the autonomous vehicle from the retailer location to the delivery location for delivering the set of items to the user at the delivery location.

13. The computer program product of claim 12, wherein the instructions further cause the processor to perform steps comprising:

feeding a collection of items purchased by one or more users of the online system into a large language model (LLM) to generate the plurality of item categories for the conversion opportunity.

14. The computer program product of claim 12, wherein the instructions further cause the processor to perform steps comprising:

requesting a large language model (LLM) to provide a textual description of an intent of the conversion opportunity based on a prompt input into the LLM, wherein the prompt includes information about the plurality of item categories; and communicating the textual description of the intent of the conversion opportunity to the group of entities.

15. The computer program product of claim 12, wherein the instructions further cause the processor to perform steps comprising:

generating, by the machine-learning model, the respective score for each of the plurality of offers based on the predicted likelihood of the user selecting the set of items provided by the respective entity of the group of entities that is associated with each of the plurality of offers.

16. The computer program product of claim 12, wherein the instructions further cause the processor to perform steps comprising:

identifying, by the machine-learning model and for the user, the respective item from the database for each of the plurality of item categories.

17. The computer program product of claim 12, wherein the instructions further cause the processor to perform steps comprising:

identifying, by the machine-learning model and for the user, the respective item from the database for each of the plurality of item categories, based on one or more attributes of that item category and information about a set of items of that item category purchased by the user over a defined time period.

18. The computer program product of claim 12, wherein the instructions further cause the processor to perform steps comprising:

providing, by the machine-learning model, a score to each candidate item of a plurality of candidate items from the database of the entity for each of the plurality of item categories, based on a predicted likelihood of the user selecting a set of items populated with that candidate item; and identifying, by the machine-learning model, the respective item for populating the set of items based on the score of each candidate item.

19. The computer program product of claim 12, wherein the instructions further cause the processor to perform steps comprising:

identifying, by the machine-learning model, a profile of the user based at least in part on information about a collection of items purchased by the user over a defined time period; and prompting a large language model (LLM) with the profile of the user and information about the populated set of items to generate a description of the set of items for presentation to the user at the user interface.

20. A computer system comprising:

a processor; and a non-transitory computer-readable storage medium having instructions that, when executed by the processor, cause the computer system to perform steps comprising:

communicating, via a network and to a group of devices associated with a group of entities, a signal indicative of a conversion opportunity, wherein the conversion opportunity defines a plurality of item categories each associated with a respective item to be included in a set of items associated with the plurality of item categories that share a common theme;

responsive to the communicated signal, receiving, via the network and from each device associated with a respective entity in the group of entities, a respective offer of a plurality of offers for the conversion opportunity;

applying a machine-learning model to each of the plurality of offers and information about one or more items of each of the plurality of item categories that are converted by a user of an online system over a defined time period to generate a respective score of a plurality of scores for each of the plurality of offers, wherein the machine-learning model is trained to predict a likelihood of the user selecting the set of items provided by the respective entity if presented given information about the plurality of item categories, the respective score indicative of the predicted likelihood;

selecting, using the plurality of scores, an offer of the plurality of offers;

populating the set of items, for each of the plurality of item categories, with a respective item of a plurality of items from a database of an entity from the group of entities that is associated with the selected offer;

presenting the set of items to the user, wherein presenting the set of items to the user causes a device associated with the user to display a user interface with information about the set of items, an icon representing the set of items, and an option to add the set of items displayed at the user interface into a cart of the user;

receiving, via the network and from the device associated with the user, information about adding the set of items into the cart and placing an order including the set of items;

responsive to placing the order, assigning a servicing of the order to a picker that is a fully-autonomous robot;

upon assigning the servicing of the order, instructing, via collection instructions stored at the computer-readable storage medium and executed by the processor, the picker operating as the fully-autonomous robot to collect the set of items in a retailer location;

physically collecting, by the picker operating as the fully-autonomous robot and using the collection instructions, the set of items in the retailer location;

upon collecting the set of items in the retailer location, controlling, via navigation instructions stored at the computer-readable storage medium and executed by the processor, a movement of the fully-autonomous robot along with an autonomous vehicle from the retailer location to a delivery location associated with the user; and moving, along a navigation route identified using the navigation instructions, the fully-autonomous robot along with the autonomous vehicle from the retailer location to the delivery location for delivering the set of items to the user at the delivery location.

\* \* \* \* \*